Nov. 1, 1960     T. C. MANN     2,958,794
VARIABLE SPEED CUTTER DRIVE

Filed Dec. 8, 1958     3 Sheets-Sheet 1

INVENTOR
Theodore C. Mann
By Carlson, Pitzner, Hubbard & Wolfe
ATTORNEY

Nov. 1, 1960 T. C. MANN 2,958,794
VARIABLE SPEED CUTTER DRIVE
Filed Dec. 8, 1958 3 Sheets-Sheet 2
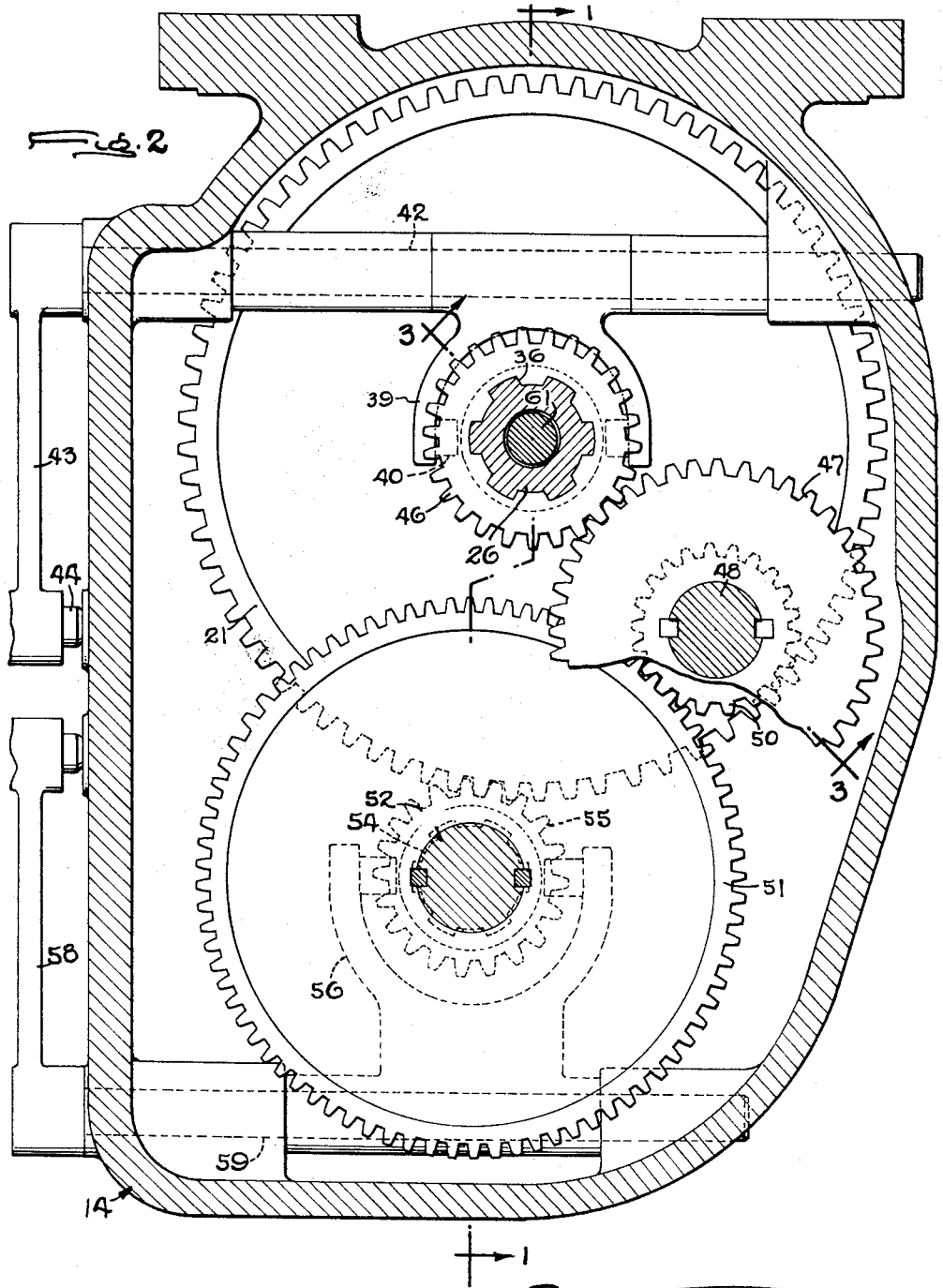
INVENTOR
Theodore C. Mann
By Carlson, Pitzner, Hubbard & Wolfe
ATTORNEY

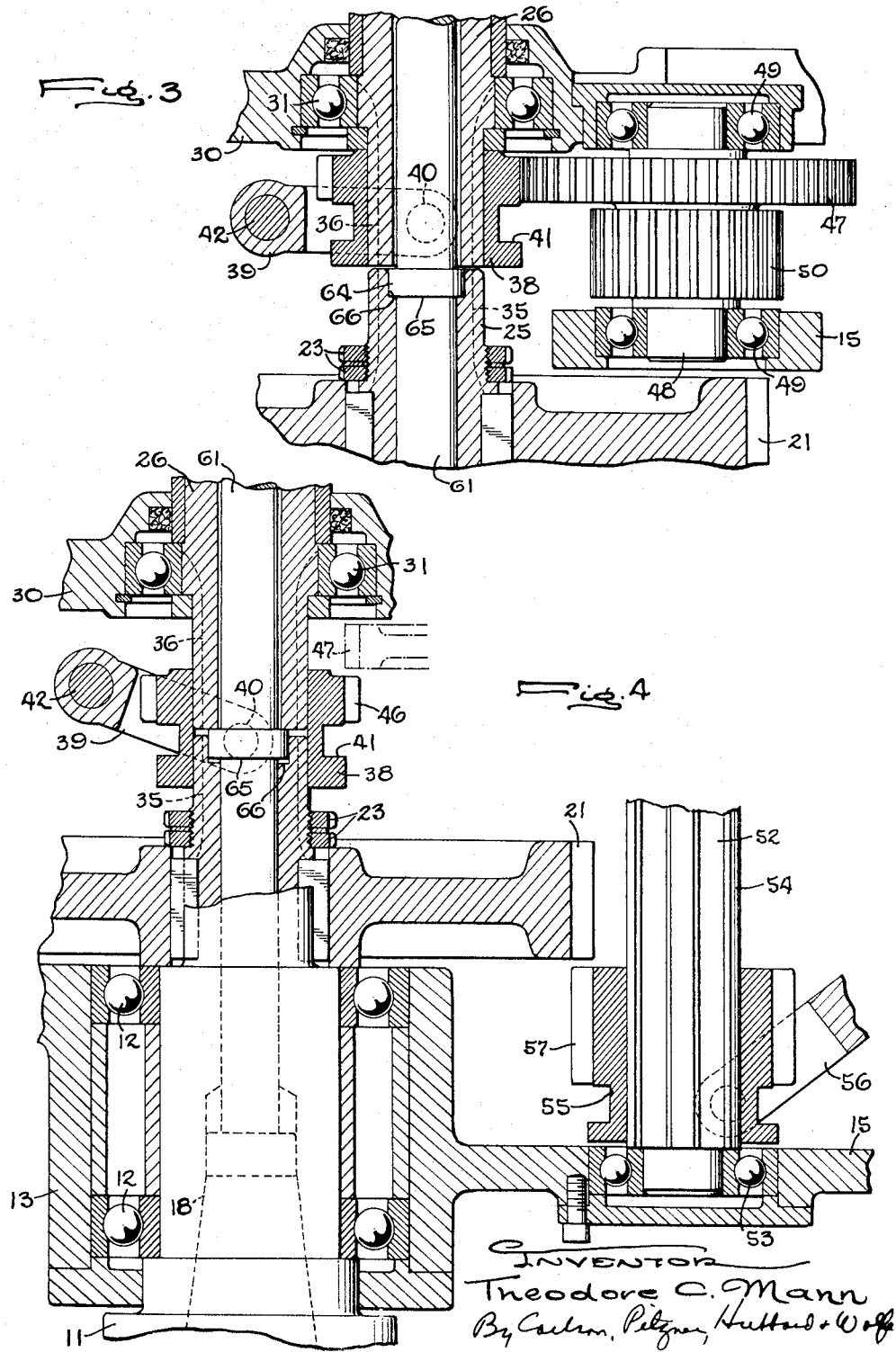

United States Patent Office 2,958,794
Patented Nov. 1, 1960

2,958,794

VARIABLE SPEED CUTTER DRIVE

Theodore C. Mann, Beloit, Wis., assignor to Ekstrom-Carlson & Co., Rockford, Ill., a corporation of Illinois Filed Dec. 8, 1958, Ser. No. 778,718

2 Claims. (Cl. 310—75)

This invention relates to a mechanism for enabling a cutter spindle to be driven alternatively through a speed reducer or through a more direct drive for high speed operation.

The general object is to provide a mechanism for enabling an electric motor to be coupled to a cutter spindle through speed reduction gearing for low speed operation and connected alternatively and independently of the gearing directly to the spindle for high speed operation.

Another object is to equip a motor drive of the above character for convenient use of a screw rod to tighten the cutter in the spindle under the alternative types of drives.

Other objects and advantages of the invention will become apparent from the following detailed description taken in connection with the accompanying drawings, in which Figure 1 is a fragmentary longitudinal section of a spindle drive mechanism embodying the novel features of the present invention, the section being taken on the line 1—1 of Fig. 2.

Fig. 2 is a fragmentary section taken along the line 2—2 of Fig. 1.

Fig. 3 is a fragmentary section taken along the line 3—3 of Fig. 2.

Fig. 4 is an enlargement of a part of Fig. 1 showing the parts coupled for high speed operation.

Figure 1:
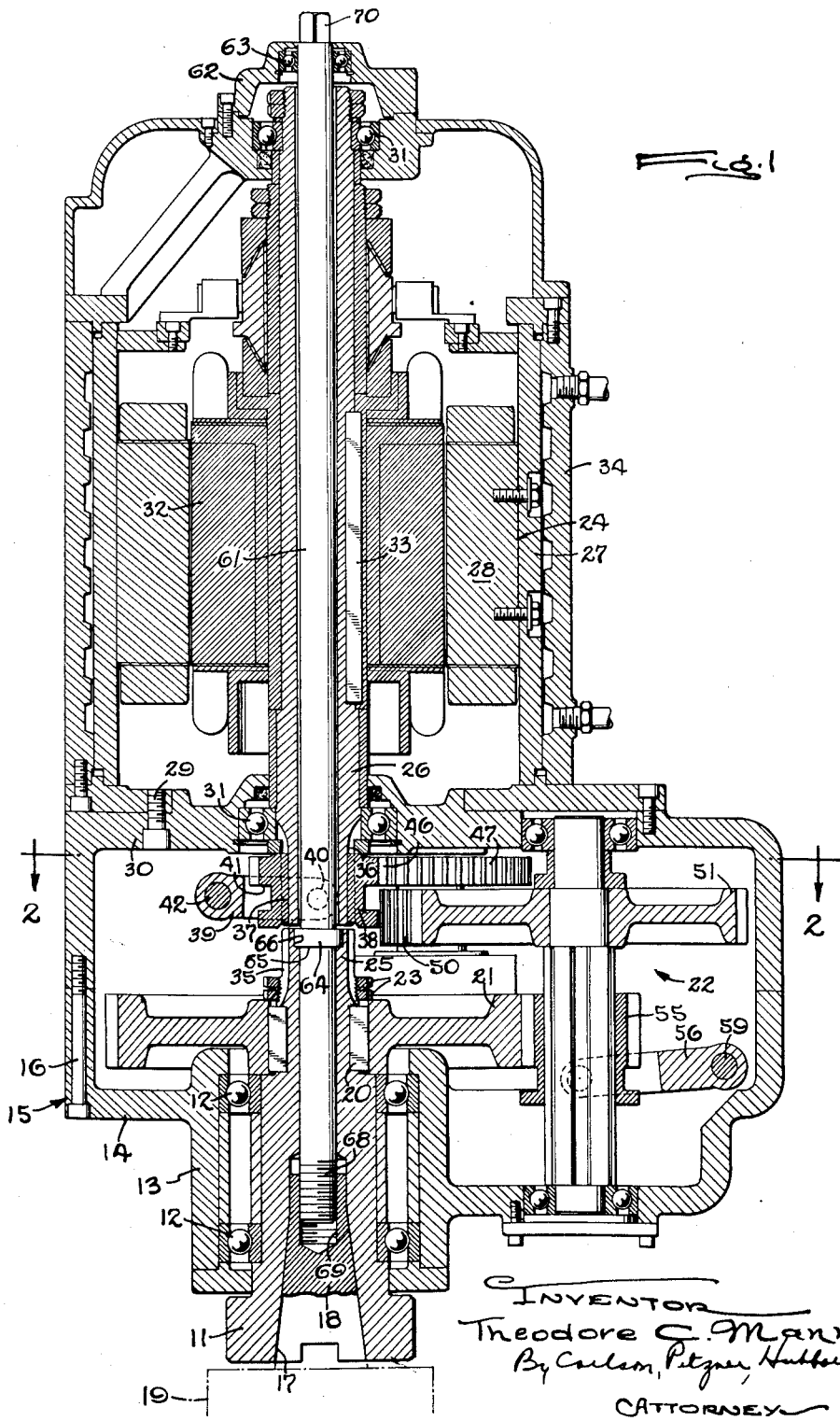

In the exemplary embodiment shown in the drawings, a cutter spindle 11 to be driven in accordance with the present invention is journaled intermediate its ends in axially spaced bearings 12 mounted in a flange 13 on the outer wall 14 of a hollow box-like gear housing 15 made in two parts clamped together by screws 16. The spindle is hollow and formed at its outer end with a tapered recess or seat 17 for receiving the shank 18 of a cutter 19. Beyond the inner end of the flange 13, the spindle carries and is permanently coupled by a key 20 to the low speed terminal gear 21 of a speed reduction train 22 disposed within the housing. The gear is held in place by nuts 23 threaded onto the spindle.

The spindle is driven directly or through the reduction gearing 22 by an electric motor 24 mounted in a novel relation with respect to the inner spindle end 25 so that the latter and the motor shaft 26 may be coupled directly without any associated belts or gearing which would be subject to wear or in any way interfere with driving of the spindle at extremely high speed such as is used in routing operations. To accomplish this, the generally cylindrical casing 27 surrounding and supporting the motor stator 28 is clamped by bolts 29 against the inner wall 30 of the housing 15 in a position to aline the motor shaft and its supporting bearings 31 precisely with the spindle 11, these bearings being in walls at opposite ends of the motor casing. The rotor 32 is keyed at 33 to the shaft 26 intermediate the ends of the latter. To facilitate operation of the cutter at the desired high speed the stator is cooled by water circulated through a jacket 34 surrounding the motor casing.

The inner end of the motor shaft projects through the housing wall 30 and terminates short of but close to the inner end 25 of the cutter spindle. These shaft and spindle ends are formed with equally spaced spline teeth 35 and 36 of the same cross sectional shape and adapted to mate with internal teeth 37 on a collar 38 carried by the motor shaft and slidable along the latter between retracted and advanced positions shown in Figs. 1 and 4. When the collar is retracted, its teeth 37 are disengaged from the spindle teeth 35. In the advanced position, the collar overlaps the ends of both the spindle and the motor shaft as shown in Fig. 4, the two being then closely coupled directly together for turning of the spindle at the speed of the motor. Shifting of the collar back and forth may be effected by a yoke 39 having pins 40 projecting into an external groove 41 in the collar. A rockshaft 42 supporting the yoke projects through the side of the housing 15 and is adapted to be turned by an arm 43 (Fig. 2) between the advanced and retracted positions of the collar as determined by the usual detent 44.

Retraction of the collar to the position shown in Figs. 1 and 3 also serves to couple the motor shaft to the speed reduction gearing 22. To this end, gear teeth 46 are cut around the collar adjacent the groove 41 to form a pinion adapted to mesh as shown in Figs. 2 and 3 with the teeth of a larger gear 47 of the same width keyed to a shaft 48 which is journaled at opposite ends in bearings 49 in wall of the housing 15. When the collar is slid to the advanced position (Fig. 4), the pinion 46 is carried out of mesh with the gear 47 and the motor is disconnected from the input end of the gear train 22.

Fast on the shaft 48 adjacent the gear 47 is a pinion 50 permanently in mesh with a gear 51 keyed to a shaft 52 which is mounted in bearings 53 on the housing 15 and having spline teeth 54 (Fig. 4) which are received in spline grooves formed around the interior of a collar 55. The latter is shiftable by a yoke 56 between one position (Fig. 1) in which a pinion 57 on the collar meshes with the teeth of the spindle gear 21 and a second position (Fig. 4) out of mesh with this gear. In the latter position, the gear is disconnected from the output end of the reduction gearing 22 and turns idly while the spindle is coupled directly to the motor shaft. The yoke 56 is shifted by manipulating an arm 58 on a shaft 59 supporting the yoke.

It will be observed that when the gear shift levers 43 and 58 are positioned as shown in Fig. 4, the speed reduction gear train will be uncoupled at two points, that is, the collar pinion 46 is out of mesh with the first gear 47 of the train and the pinion 57 is separated from the spindle gear 21. These gears turn idly with the motor shaft and the spindle and therefore there are no meshing gears that rotate and are thus subject to wear at the high speeds at which the spindle must be driven for certain operations such as routing.

In another aspect of the invention, provision is made for using an ordinary threaded rod 61 to draw the cutter shank 18 into its seat 17 while leaving the rod conveniently accessible from a point outside the tool head to permit removal and replacement of the cutter. To accomplish this and at the same time accommodate the differences that may occur between the speeds of the motor and spindle, the shaft of the motor is a tube and the rod 61 is extended loosely through the tube and journaled at 63 in a cap 62. Then, within the spindle itself the rod is formed with an enlargement 64 terminating in a shoulder 65 which faces outwardly for abutment with the bottom of a counterbore 66 in the inner end of the spindle.

With the shoulder seated as shown in Fig. 1, a thread 68 on the outer end of the rod 61 will engage the internally threaded bore 69 in the shank end. Then, by turning the rod, the shank may be drawn into or projected outwardly from the seat in the spindle. To permit such turning from a point outside of the tool head, the rod is extended all the way through the motor shaft 26 and its outer end 70 is squared or otherwise shaped for coupling with a wrench or other tool for effecting the turning.

The motor, the spindle and the gearing associated as above described provide an extremely compact tool head of comparatively small size in relation to its capacity. The same arrangement when used in conjunction with equipment (not shown) for varying the speed of the motor provides for operation of the spindle over an extremely wide speed range so that the head may be used in machining a wide variety of work materials using any kind of cutting material while always making available the cutting speed best suited for most efficient cutting action.

I claim as my invention:

1. The combination of, a hollow housing, an electric motor having a casing fixed to one end of said housing and a tubular rotor shaft journaled at axially spaced points in opposite ends of said casing with one end of the shaft projecting beyond said casing and into said housing, said projecting end having external spline teeth formed thereon, a hollow cutter spindle journaled in said housing to turn about the axis of said shaft, the inner end of said spindle terminating adjacent said shaft end and being formed with external spline teeth, a socket formed in the outer end portion of said spindle for receiving and supporting the tapered and threaded shank of a metal removing cutter, said spindle end being counterbored to provide an internal shoulder spaced inwardly from said shank, a sleeve slidable axially on the spline teeth of said shaft and having spline teeth on its outer end adapted to mate with the teeth on said spindle end, means for sliding said sleeve axially between advanced and retracted positions to alternatively couple the sleeve directly to or uncouple the same from said spindle end, a pinion on said sleeve, a speed reduction gear train mounted in said housing and having a low speed gear fast on said spindle and a high speed gear meshing with said pinion when said sleeve is in said retracted position but out of mesh with the pinion in said advanced position of the sleeve, a rod extending loosely through and journaled in said tubular motor shaft and having an external shoulder abutting against said spindle shoulder, a thread on the inner end of said rod adapted to be screwed into said shank to draw the latter into said spindle socket, and means on the exposed outer end of said rod for turning the rod relative to said shaft.

2. The combination of, a hollow housing, an electric motor having a casing fixed to one end of said housing and a rotor shaft journaled at axially spaced points in opposite ends of said casing with one end of the shaft projecting beyond said casing and into said housing, said projecting end having external spline teeth formed thereon, a cutter spindle journaled intermediate its ends in said housing to turn about the axis of said shaft, the inner end of said spindle terminating adjacent said shaft end and being formed with external spline teeth, a sleeve slidable axially on the spline teeth of said shaft and having spline teeth on its outer end adapted to mate with the teeth on said spindle end, means for sliding said sleeve axially between advanced and retracted positions to alternatively couple the sleeve directly to or uncouple the same from said spindle end, a pinion on said sleeve, and a speed reduction gear train mounted in said housing and having a low speed gear fast on said spindle and a high speed gear meshing with said pinion when said sleeve is in said retracted position but is out of mesh with the pinion in said advanced position of the sleeve.

References Cited in the file of this patent

FOREIGN PATENTS 587,057    Germany _____ Aug. 29, 1929